(12) United States Patent
Richter et al.

(10) Patent No.: US 12,074,419 B2
(45) Date of Patent: *Aug. 27, 2024

(54) RETROFIT REMOTE CONTROL DEVICE MOUNTING ASSEMBLY

(71) Applicant: Lutron Technology Company LLC, Coopersburg, PA (US)

(72) Inventors: Isabel Jane Hunt Richter, Lexington, VA (US); Aaron Jeffrey Wilz, Emmaus, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/219,932

(22) Filed: Jul. 10, 2023

(65) Prior Publication Data

US 2023/0352923 A1  Nov. 2, 2023

Related U.S. Application Data

(63) Continuation of application No. 17/952,769, filed on Sep. 26, 2022, now Pat. No. 11,735,897, which is a (Continued)

(51) Int. Cl.
*H02G 3/14* (2006.01)
*H02G 3/08* (2006.01)
*H05B 47/19* (2020.01)

(52) U.S. Cl.
CPC .............. *H02G 3/081* (2013.01); *H02G 3/14* (2013.01); *H05B 47/19* (2020.01)

(58) Field of Classification Search
CPC ............ H01H 9/12; H01H 9/28; H01H 25/06; H01H 3/02; H01H 3/00; H01H 23/04;
(Continued)

(56) References Cited

U.S. PATENT DOCUMENTS

| 4,733,330 A | 3/1988 | Tanaka et al. |
| 5,264,761 A | 11/1993 | Johnson et al. |

(Continued)

FOREIGN PATENT DOCUMENTS

| CN | 2596671 Y | 12/2003 |
| WO | 2017210532 A1 | 12/2017 |
| WO | 2017210640 A1 | 12/2017 |

*Primary Examiner* — Angel R Estrada
(74) *Attorney, Agent, or Firm* — Flaster Greenberg P.C.

(57) ABSTRACT

A remote control device may be mounted to a structure. The remote control device may include a control unit, a base, a faceplate, an adapter, and a mounting plate. The adapter may be configured to be attached to the faceplate. The adapter may be configured to be secured to the structure. The mounting plate may float between the adapter and the structure when the adapter is secured to the structure. The mounting plate may include a frame, a mounting tab, and a plurality of spring arms. The mounting tab may extend from the frame, for example, a platform on the frame. The mounting tab may be configured to prevent rotation of the base of the remote control device when the base is attached to the mounting plate. The plurality of spring arms may be configured to bias the mounting tab away from the structure.

20 Claims, 15 Drawing Sheets

Related U.S. Application Data continuation of application No. 16/926,061, filed on Jul. 10, 2020, now Pat. No. 11,502,490.

(60) Provisional application No. 62/882,184, filed on Aug. 2, 2019, provisional application No. 62/873,382, filed on Jul. 12, 2019.

(58) Field of Classification Search
CPC .......... H01H 9/02; H01H 25/065; H02G 3/14; H02G 3/08; H02G 3/081; H02G 3/12; H05K 5/03; H05K 5/00; H05K 5/02; H05B 47/19; H05B 47/175
USPC .................. 174/66, 67, 50, 53, 57, 480, 481; 220/3.2–3.9, 4.02, 241, 242; 439/535, 439/536

See application file for complete search history.

(56) References Cited

U.S. PATENT DOCUMENTS

| | | | |
|---|---|---|---|
| 5,744,750 A | 4/1998 | Almond | |
| 5,905,442 A | 5/1999 | Mosebrook et al. | |
| 7,183,487 B1 | 2/2007 | Oyoung et al. | |
| 7,573,208 B2 | 8/2009 | Newman et al. | |
| 7,763,799 B2 | 7/2010 | Johnson | |
| 7,834,856 B2 | 11/2010 | Grinshpoon et al. | |
| 7,902,458 B2 | 3/2011 | Eshelman | |
| 7,940,167 B2 | 5/2011 | Steiner et al. | |
| 8,009,042 B2 | 8/2011 | Steiner et al. | |
| 8,013,245 B2 | 9/2011 | Korcz et al. | |
| 8,199,010 B2 | 6/2012 | Sloan et al. | |
| 8,330,638 B2 | 12/2012 | Altonen et al. | |
| 8,389,857 B2 | 3/2013 | Petrillo et al. | |
| 8,410,706 B2 | 4/2013 | Steiner et al. | |
| 8,451,116 B2 | 5/2013 | Steiner et al. | |
| 8,835,764 B2 | 9/2014 | Seff et al. | |
| 9,208,965 B2 | 12/2015 | Busby et al. | |
| 9,418,802 B2 | 8/2016 | Romano et al. | |
| 9,520,247 B1 | 12/2016 | Finnegan et al. | |
| 9,583,288 B2 | 2/2017 | Jones et al. | |
| 9,799,469 B2 | 10/2017 | Bailey et al. | |
| 9,818,559 B2 | 11/2017 | Tress et al. | |
| 9,959,997 B2 | 5/2018 | Bailey et al. | |
| 10,410,802 B2 | 9/2019 | Dimberg et al. | |
| 10,902,718 B2 | 1/2021 | Camden et al. | |
| 11,502,490 B2 | 11/2022 | Richter et al. | |
| 11,735,897 B2 * | 8/2023 | Richter | H02G 3/14 174/66 |
| 2008/0111491 A1 | 5/2008 | Spira et al. | |
| 2009/0206983 A1 | 8/2009 | Knode et al. | |
| 2012/0292174 A1 | 11/2012 | Mah et al. | |
| 2013/0222122 A1 | 8/2013 | Killo et al. | |
| 2014/0117871 A1 | 5/2014 | Swatsky et al. | |
| 2015/0077021 A1 | 3/2015 | McCarthy et al. | |
| 2015/0371534 A1 | 12/2015 | Dimberg et al. | |
| 2016/0073479 A1 | 3/2016 | Erchak et al. | |
| 2017/0105176 A1 | 4/2017 | Finnegan et al. | |
| 2017/0352506 A1 | 12/2017 | Dimberg | |
| 2017/0354011 A1 | 12/2017 | Dimberg et al. | |
| 2017/0354023 A1 | 12/2017 | Dimberg et al. | |
| 2018/0190451 A1 | 7/2018 | Scruggs | |
| 2020/0144007 A1 | 5/2020 | Shivell | |

\* cited by examiner

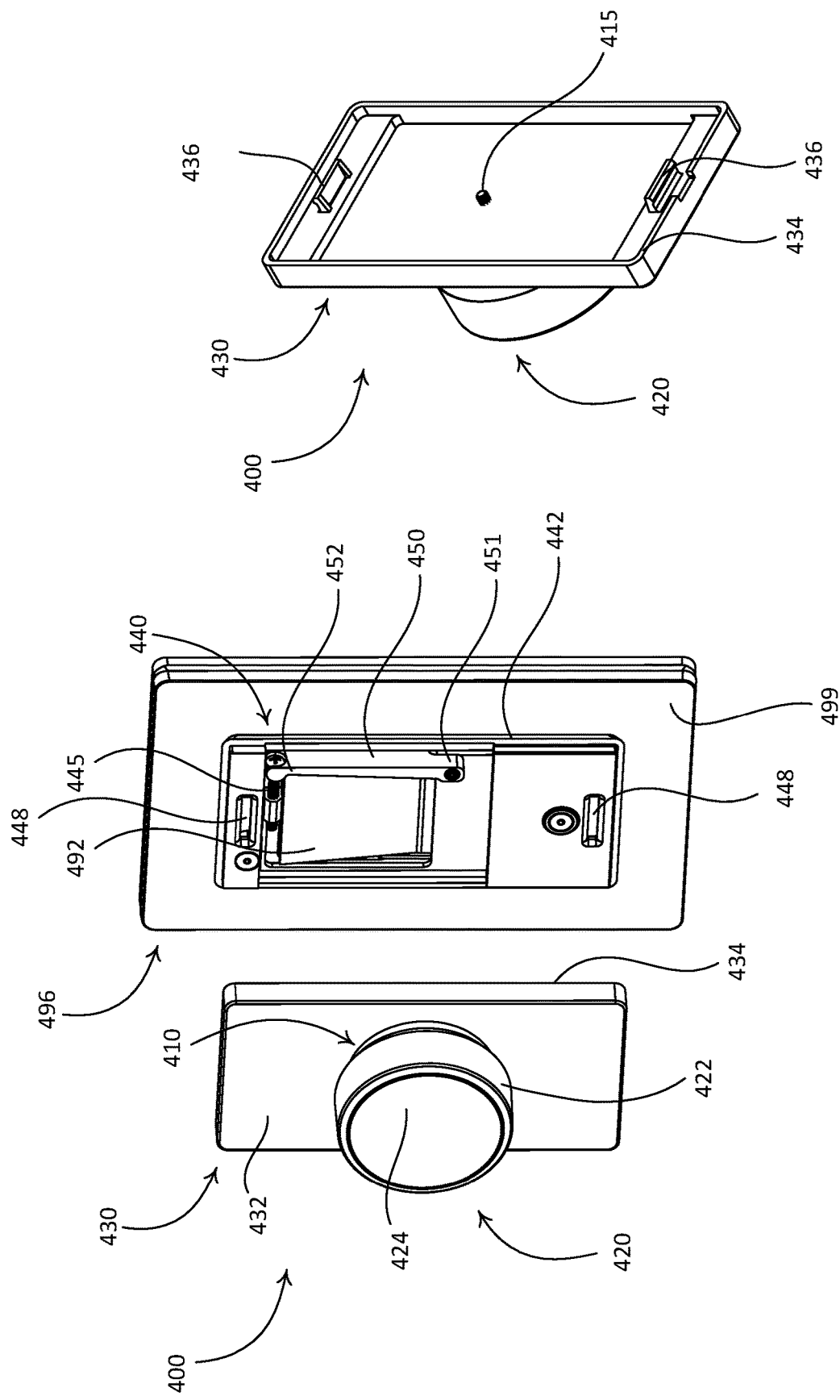

RETROFIT REMOTE CONTROL DEVICE MOUNTING ASSEMBLY

CROSS-REFERENCE TO RELATED APPLICATIONS

This application is a continuation of U.S. Non-Provisional patent application Ser. No. 17/952,769, filed Sep. 26, 2022, which is a continuation of U.S. Non-Provisional patent application Ser. No. 16/926,061, filed Jul. 10, 2020, which claims the benefit of Provisional U.S. Patent Application No. 62/873,382, filed Jul. 12, 2019 and Provisional U.S. Patent Application No. 62/882,184, filed Aug. 2, 2019, the disclosures of which are incorporated herein by reference in their entirety.

BACKGROUND

During the installation of typical load control systems, standard mechanical switches, such as traditional toggle switches or decorator paddle switches, may be replaced by more advanced load control devices, such as dimmer switches, that control the amount of power delivered from an alternating current (AC) power source to one or more electrical loads. Such an installation procedure typically requires that the existing mechanical switch be disconnected from the electrical wiring and removed from a wallbox in which it is mounted, and that the load control device then be connected to the electrical wiring and installed in the wallbox. An average consumer may not feel comfortable performing the electrical wiring required in such an installation. Accordingly, such a procedure may typically be performed by an electrical contractor or other skilled installer. However, hiring an electrical contractor may be cost prohibitive to the average consumer.

Controllable light sources, such as controllable screw-in light-emitting diode (LED) lamps, may provide an easier solution for providing advanced control of lighting. For example, an older incandescent lamp simply be unscrewed from a socket and the controllable light source may be screwed into the socket. The controllable light sources may be controlled by remote control devices. However, the sockets in which the controllable light sources are installed may be controlled by an existing wall-mounted light switch. When the wall-mounted light switch is operated to an off position, power to the controllable light source may be cut, such that the controllable light source may no longer respond to commands transmitted by the remote control devices. Accordingly, it is desirable to prevent operation of such a wall-mounted light switch to ensure that the delivery of power to the controllable light source continues uninterrupted.

SUMMARY

As described herein, a remote control device may provide a simple retrofit solution for an existing switched control system. Implementation of the remote control device, for example in an existing switched control system, may enable energy savings and/or advanced control features, for example without requiring any electrical re-wiring and/or without requiring the replacement of any existing mechanical switches.

The remote control device may be configured to associate with, and control, a load control device of a load control system, without requiring access to the electrical wiring of the load control system. An electrical load may be electrically connected to the load control device such that the remote control device may control an amount of power delivered to the electrical load, via the load control device.

In a first implementation, the remote control device may include a base (e.g., a mounting assembly) that is configured to be mounted over the toggle actuator of the switch, and a control unit that is releasably attachable to the base. The control unit may include an attachment portion that is configured to be attached to the base. The control unit may include a rotating portion that is configured to rotate relative to the attachment portion, and thus relative to the base.

The base may include a base and a release tab that is operatively coupled to the base. The base may be operated, via the release tab, from a locking position in which the control unit is secured to the base, into a release position in which the control unit may be detached from the base.

The control unit may include an actuation portion that is carried by the rotating portion. The actuation portion may be configured to be actuated along a direction that extends parallel to an axis of rotation of the rotating portion.

The base may be configured to be attached to a pedestal. The pedestal may include a plate and a mounting tab. The plate may be configured to rest on a horizontal surface. The mounting tab may extend from the plate (e.g., a platform on the plate). The mounting tab may be configured to extend into an opening defined by the base. The mounting tab may be configured to prevent rotation of the base of the remote control device when the base is attached to the pedestal.

The remote control device may be mounted to a structure (e.g., where there is no light switch). The remote control device may include a control unit, a base, a faceplate, an adapter, and a mounting plate. The adapter may be configured to be attached to the faceplate. The adapter may be configured to be secured to the structure. The mounting plate may float between the adapter and the structure when the adapter is secured to the structure. The mounting plate may include a frame, a mounting tab, and a plurality of spring arms. The mounting tab may extend from the frame (e.g., a platform on the frame). The mounting tab may be configured to extend into an opening defined by the base. The mounting tab may be configured to prevent rotation of the base of the remote control device when the base is attached to the mounting plate. The plurality of spring arms may be configured to bias the mounting tab forward (e.g., away from the structure).

BRIEF DESCRIPTION OF THE DRAWINGS

FIG. 14 is a partially exploded view of the example remote control device shown in FIG. 13 with an example base component attached to a paddle actuator of a light switch.

FIG. 15 is rear perspective view of the example retrofit remote control device depicted in FIG. 13, illustrating the control unit component attached to the base component.

DETAILED DESCRIPTION

Figure 1:
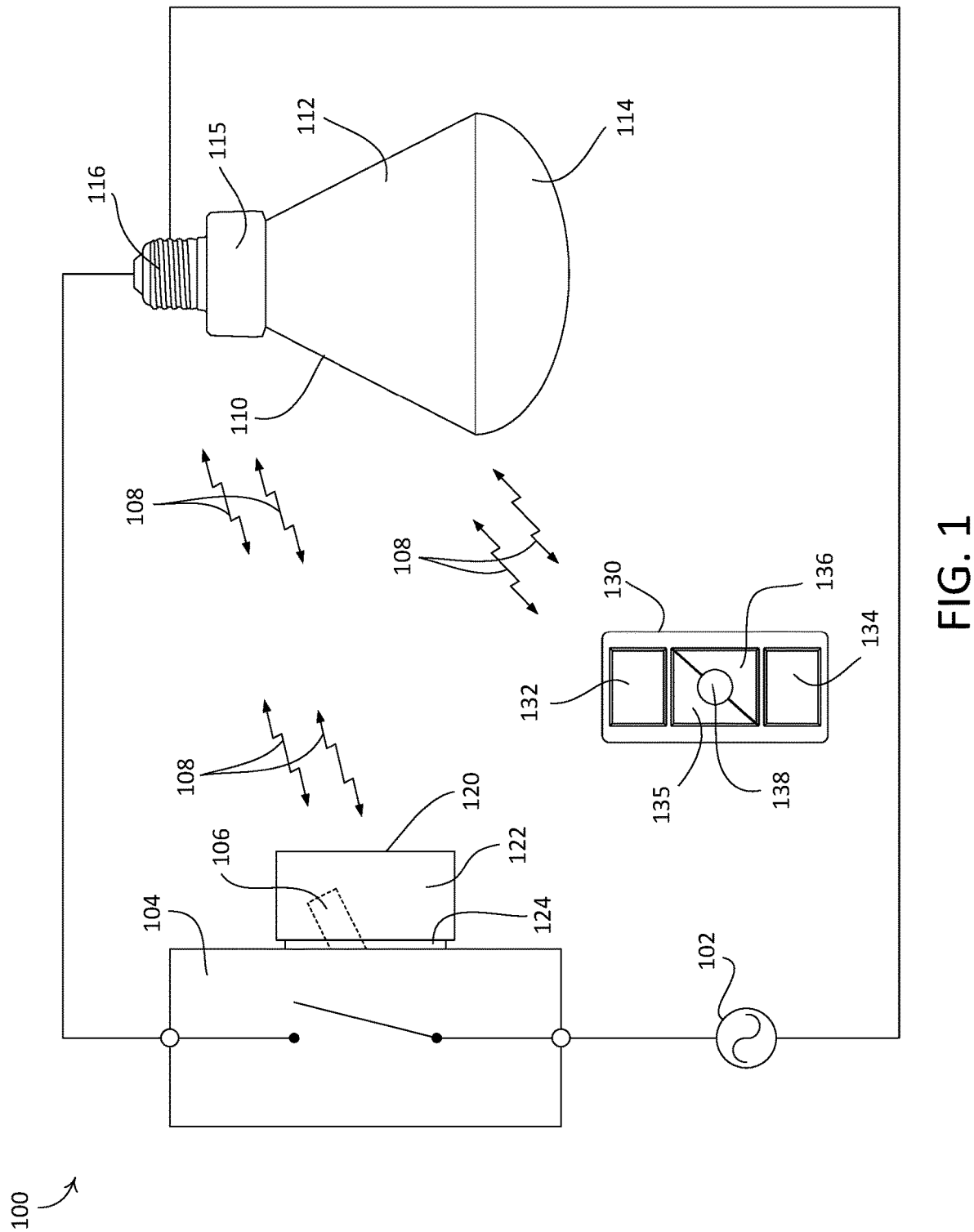
FIG. 1 is a simplified diagram of an example load control system that includes an example retrofit remote control device.

FIG. 1 depicts an example load control system 100. As shown, the load control system 100 is configured as a lighting control system that includes a load control device, such as a controllable light source 110, and a remote control device 120, such as a battery-powered rotary remote control device. The remote control device 120 may include a wireless transmitter. The load control system 100 may include a standard, single pole single throw (SPST) maintained mechanical switch 104 (e.g., a toggle switch, a paddle switch, a pushbutton switch, or a "light switch," or other suitable switch) that may be in place prior to installation of the remote control device 120 (e.g., pre-existing in the load control system 100). The switch 104 may be electrically coupled in series between a power source (e.g., an alternating current (AC) power source 102 or a direct-current (DC) power source) and the controllable light source 110. The switch 104 may include a toggle actuator 106 that may be actuated to toggle, for example to turn on and/or turn off, the controllable light source 110. The controllable light source 110 may be electrically coupled to the AC power source 102 when the switch 104 is closed (e.g., conductive), and may be disconnected from the AC power source 102 when the switch 104 is open (e.g., non-conductive).

The remote control device 120 may be operable to transmit wireless signals, for example radio frequency (RF) signals 108, to the controllable light source 110 for controlling the intensity and/or color (e.g., color temperature) of the controllable light source 110. The controllable light source 110 may be associated with the remote control device 120 during a configuration procedure of the load control system 100, such that the controllable light source 110 is then responsive to the RF signals 108 transmitted by the remote control device 120. An example of a configuration procedure for associating a remote control device with a load control device is described in greater detail in commonly-assigned U.S. Patent Publication No. 2008/0111491, published May 15, 2008, entitled "Radio-Frequency Lighting Control System," the entire disclosure of which is hereby incorporated by reference. The remote control device 120 may also be configured to transmit wireless signals for control of other electrical loads, such as for example, the volume of a speaker and/or audio system, the position of a motorized window treatment, the setpoint temperature of a heating and/or cooling system, and/or a controllable characteristic of another electrical load or device.

The controllable light source 110 may include an internal lighting load (not shown), such as, for example, a light-emitting diode (LED) light engine, a compact fluorescent lamp, an incandescent lamp, a halogen lamp, or other suitable light source. The controllable light source 110 includes a housing 112 that defines an end portion 114 through which light emitted from the lighting load may shine. The controllable light source 110 may include an enclosure 115 that is configured to house one or more electrical components of the controllable light source 110, such as an integral load control circuit (not shown), for controlling the intensity of the lighting load between a low-end intensity (e.g., approximately 1%) and a high-end intensity (e.g., approximately 100%). The controllable light source 110 may include a wireless communication circuit (not shown) housed inside the enclosure 115, such that the controllable light source 110 may be operable to receive the RF signals 108 transmitted by the remote control device 120 and control the intensity of the lighting load in response to the received RF signals. As shown, the enclosure 115 is attached to the housing 112. Alternatively, the enclosure 115 may be integral with, for example monolithic with, the housing 112, such that the enclosure 115 defines an enclosure portion of the housing 112. The controllable light source 110 may include a screw-in base 116 that is configured to be screwed into a standard Edison socket, such that the controllable light source may be coupled to the AC power source 102. The controllable light source 110 may be configured as a downlight (e.g., as shown in FIG. 1) that may be installed in a recessed light fixture. The controllable light source 110 is not limited to the illustrated screw-in base 116, and may include any suitable base, for example a bayonet-style base or other suitable base providing electrical connections.

The load control system 100 may also include one or more other devices configured to wirelessly communicate with the controllable light source 110. As shown, the load control system 100 includes a handheld, battery-powered, remote control device 130 for controlling the controllable light source 110. The remote control device 130 may include one or more buttons, for example, an on button 132, an off button 134, a raise button 135, a lower button 136, and a preset button 138, as shown in FIG. 1. The remote control device 130 may include a wireless communication circuit (not shown) for transmitting digital messages (e.g., including commands to control the lighting load) to the controllable light source 110, for example via the RF signals 108, responsive to actuations of one or more of the buttons 132, 134, 135, 136, and 138. Alternatively, the remote control device 130 may be mounted to a wall or supported by a pedestal, for example a pedestal configured to be mounted on a tabletop. Examples of handheld battery-powered remote controls are described in greater detail in commonly assigned U.S. Pat. No. 8,330,638, issued Dec. 11, 2012, entitled "Wireless Battery Powered Remote Control Having Multiple Mounting Means," and U.S. Pat. No. 7,573,208, issued Aug. 22, 1009, entitled "Method Of Programming A Lighting Preset From A Radio-Frequency Remote Control," the entire disclosures of which are hereby incorporated by reference.

The load control system 100 may also include one or more of a remote occupancy sensor or a remote vacancy sensor (not shown) for detecting occupancy and/or vacancy conditions in a space surrounding the sensors. The occupancy or vacancy sensors may be configured to transmit digital messages to the controllable light source 110, for example via the RF signals 108, in response to detecting occupancy or vacancy conditions. Examples of RF load control systems having occupancy and vacancy sensors are described in greater detail in commonly-assigned U.S. Pat. No. 7,940,167, issued May 10, 2011, entitled "Battery Powered Occupancy Sensor," U.S. Pat. No. 8,009,042, issued Aug. 30, 2011, entitled "Radio Frequency Lighting Control System With Occupancy Sensing," and U.S. Pat. No. 8,199,010, issued Jun. 12, 2012, entitled "Method And Apparatus For Configuring A Wireless Sensor," the entire disclosures of which are hereby incorporated by reference.

The load control system 100 may include a remote daylight sensor (not shown) for measuring a total light intensity in the space around the daylight sensor. The daylight sensor may be configured to transmit digital messages, such as a measured light intensity, to the controllable light source 110, for example via the RF signals 108, such that the controllable light source 110 is operable to control the intensity of the lighting load in response to the measured light intensity. Examples of RF load control systems having daylight sensors are described in greater detail in commonly assigned U.S. patent application Ser. No. 12/727,956, filed Mar. 19, 2010, entitled "Wireless Battery-Powered Daylight Sensor," and U.S. patent application Ser. No. 12/727,923, filed Mar. 19, 2010, entitled "Method Of Calibrating A Daylight Sensor," the entire disclosures of which are hereby incorporated by reference.

The load control system 100 may include other types of input devices, for example, radiometers, cloudy-day sensors, temperature sensors, humidity sensors, pressure sensors, smoke detectors, carbon monoxide detectors, air-quality sensors, security sensors, proximity sensors, fixture sensors, partition sensors, keypads, kinetic or solar-powered remote controls, key fobs, cell phones, smart phones, tablets, personal digital assistants, personal computers, laptops, time clocks, audio-visual controls, safety devices, power monitoring devices (such as power meters, energy meters, utility submeters, utility rate meters), central control transmitters, residential, commercial, or industrial controllers, or any combination of these input devices.

During the configuration procedure of the load control system 100, the controllable light source 110 may be associated with a wireless control device, for example the remote control device 120, by actuating an actuator on the controllable light source 110 and then actuating (e.g., pressing and holding) an actuator on the wireless remote control device (e.g., the rotating portion 122 of the remote control device 120) for a predetermined amount of time (e.g., approximately 10 seconds).

Digital messages transmitted by the remote control device 120, for example directed to the controllable light source 110, may include a command and identifying information, such as a unique identifier (e.g., a serial number) associated with the remote control device 120. After being associated with the remote control device 120, the controllable light source 110 may be responsive to messages containing the unique identifier of the remote control device 120. The controllable light source 110 may be associated with one or more other wireless control devices of the load control system 100, such as one or more of the remote control device 130, the occupancy sensor, the vacancy sensor, and/or the daylight sensor, for example using similar association process.

After a remote control device, for example the remote control device 120 or the remote control device 130, is associated with the controllable light source 110, the remote control device may be used to associate the controllable light source 110 with the occupancy sensor, the vacancy sensor, and/or the daylight sensor, without actuating the actuator 118 of the controllable light source 110, for example as described in greater detail in commonly-assigned U.S. patent application Ser. No. 13/598,529, filed Aug. 29, 2012, entitled "Two Part Load Control System Mountable To A Single Electrical Wallbox," the entire disclosure of which is hereby incorporated by reference.

The remote control device 120 may be configured to be attached to the toggle actuator 106 of the switch 104 when the toggle actuator 106 is in the on position (e.g., typically pointing upwards) and the switch 104 is closed and conductive. As shown, the remote control device 120 may include a rotating portion 122 and a base portion 124. The base portion 124 may be configured to be mounted over the toggle actuator 106 of the switch 104. The rotating portion 122 may be supported by the base portion 124 and may be rotatable about the base portion 124.

When the remote control device 120 is mounted over the toggle actuator of a switch (e.g., the toggle actuator 106), the base portion 124 may function to secure the toggle actuator 106 from being toggled. For example, the base portion 124 may be configured to maintain the toggle actuator 106 in an on position, such that a user of the remote control device 120 is not able to mistakenly switch the toggle actuator 106 to the off position, which may disconnect the controllable light source 110 from the AC power source 102, such that controllable light source 110 may not be controlled by one or more remote control devices of the load control system 100 (e.g., the remote control devices 120 and/or 130), which may in turn cause user confusion.

As shown, the remote control device 120 is battery-powered, not wired in series electrical connection between the AC power source 102 and the controllable light source 110 (e.g., does not replace the mechanical switch 104), such that the controllable light source 110 receives a full AC voltage waveform from the AC power source 102, and such that the controllable light source 110 does not receive a phase-control voltage that may be created by a standard dimmer switch. Because the controllable light source 110 receives the full AC voltage waveform, multiple controllable light sources (e.g., controllable light sources 110) may be coupled in parallel on a single electrical circuit (e.g., coupled to the mechanical switch 104). The multiple controllable light sources may include light sources of different types (e.g., incandescent lamps, fluorescent lamps, and/or LED light sources). The remote control device 120 may be configured to control one or more of the multiple controllable light sources, for example substantially in unison. In addition, if there are multiple controllable light sources coupled in parallel on a single circuit, each controllable light source may be zoned, for example to provide individual control of each controllable light source. For example, a first controllable light source 110 may be controlled by the remote control device 120, while a second controllable light source 110 may be controlled by the remote control device 130). In prior art systems, a mechanical switch (such as the switch 104, for example) typically controls such multiple light sources in unison (e.g., turns them on and/or off together).

The remote control device 120 may be part of a larger RF load control system than that depicted in FIG. 1. Examples of RF load control systems are described in commonly-assigned U.S. Pat. No. 5,905,442, issued on May 18, 1999, entitled "Method And Apparatus For Controlling And Determining The Status Of Electrical Devices From Remote Locations," and commonly-assigned U.S. Patent Application Publication No. 2009/0206983, published Aug. 20, 2009, entitled "Communication Protocol For A Radio Frequency Load Control System," the entire disclosures of which are incorporated herein by reference.

While the load control system 100 is described herein with reference to the single-pole system shown in FIG. 1, one or both of the controllable light source 110 and the remote control device 120 may be implemented in a "three-way" lighting system having two single-pole double-throw (SPDT) mechanical switches, which may be referred to as "three-way" switches, for controlling a single electrical load. To illustrate, an example system may comprise two remote control devices 120, with one remote control device 120 connected to the toggle actuator of each SPDT switch. In such a system, the toggle actuators of each SPDT switch may be positioned such that the SPDT switches form a complete circuit between the AC source and the electrical load before the remote control devices 120 are installed on the toggle actuators.

The load control system 100 shown in FIG. 1 may provide a simple retrofit solution for an existing switched control system. The load control system 100 may provide energy savings and/or advanced control features, for example without requiring any electrical re-wiring and/or without requiring the replacement of any existing mechanical switches. To install and use the load control system 100 of FIG. 1, a consumer may replace an existing lamp with the controllable light source 110, switch the toggle actuator 106 of the mechanical switch 104 to the on position, install (e.g., mount) the remote control device 120 onto the toggle actuator 106, and associate the remote control device 120 and the controllable light source 110 with each other, for example as described above.

It should be appreciated that the load control system 100 need not include the controllable light source 110. For example, in lieu of the controllable light source 110, the load control system 100 may alternatively include a plug-in load control device for controlling an external lighting load. For example, the plug-in load control device may be configured to be plugged into a receptacle of a standard electrical outlet that is electrically connected to an AC power source. The plug-in load control device may have one or more receptacles to which one or more plug-in electrical loads, such a table lamp or a floor lamp, may be plugged. The plug-in load control device may be configured to control the intensity of the lighting loads plugged into the receptacles of the plug-in load control device. It should further be appreciated that the remote control device 120 is not limited to being associated with, and controlling, a single load control device. For example, the remote control device 120 may be configured to control multiple controllable load control devices, for example substantially in unison.

Examples of remote control devices configured to be mounted over existing light switches are described in greater detail in commonly-assigned U.S. Patent Application Publication No. 2014/0117871, published May 4, 2016, and U.S. Patent Application Publication No. 2015/0371534, published Dec. 24, 2015, both entitled "Battery-Powered Retrofit Remote Control Device," the entire disclosures of which are hereby incorporated by reference.

It should further still be appreciated that, although a lighting control system with the controllable light source 110 is provided as an example above, a load control system as described herein may include more lighting loads, other types of lighting loads, and/or other types of electrical loads that may be configured to be controlled by the one or more control devices. For example, the load control system may include one or more of: a dimming ballast for driving a gas-discharge lamp; an LED driver for driving an LED light source; a dimming circuit for controlling the intensity of a lighting load; a screw-in luminaire including a dimmer circuit and an incandescent or halogen lamp; a screw-in luminaire including a ballast and a compact fluorescent lamp; a screw-in luminaire including an LED driver and an LED light source; an electronic switch, controllable circuit breaker, or other switching device for turning an appliance on and off; a plug-in control device, controllable electrical receptacle, or controllable power strip for controlling one or more plug-in loads; a motor control unit for controlling a motor load, such as a ceiling fan or an exhaust fan; a drive unit for controlling a motorized window treatment or a projection screen; one or more motorized interior and/or exterior shutters; a thermostat for a heating and/or cooling system; a temperature control device for controlling a set-point temperature of a heating, ventilation, and air-conditioning (HVAC) system; an air conditioner; a compressor; an electric baseboard heater controller; a controllable damper; a variable air volume controller; a fresh air intake controller; a ventilation controller; one or more hydraulic valves for use in radiators and radiant heating system; a humidity control unit; a humidifier; a dehumidifier; a water heater; a boiler controller; a pool pump; a refrigerator; a freezer; a television and/or computer monitor; a video camera; a volume control; an audio system or amplifier; an elevator; a power supply; a generator; an electric charger, such as an electric vehicle charger; an alternative energy controller; and/or the like.

FIGS. 2-8 depict an example remote control device 200 (e.g., a battery-powered rotary remote control device) that may be deployed, for example, as the remote control device 120 of the load control system 100 shown in FIG. 1. The remote control device 200 may be configured to be mounted over a standard light switch (e.g., the toggle actuator 106 of the SPST maintained mechanical switch 104 shown in FIG. 1). For example, as shown the remote control device 200 may be installed over the toggle actuator 204 of an installed light switch 202 without removing a faceplate 206 that is mounted to the light switch 202 (e.g., via faceplate screws 208).

Figure 2:
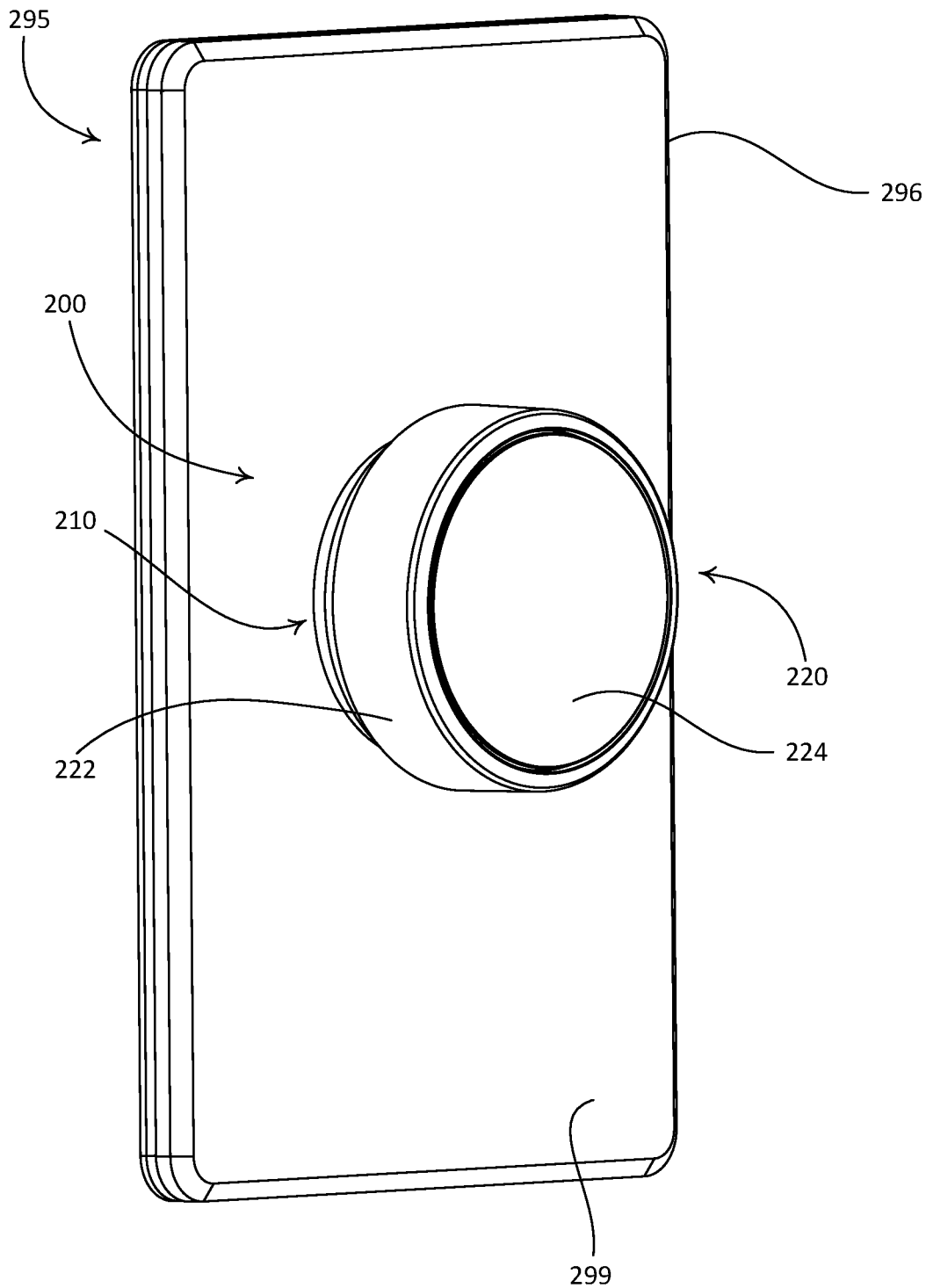
FIG. 2 is a front perspective view of an example retrofit remote control device that includes a control unit component and a base component.
Figure 3:
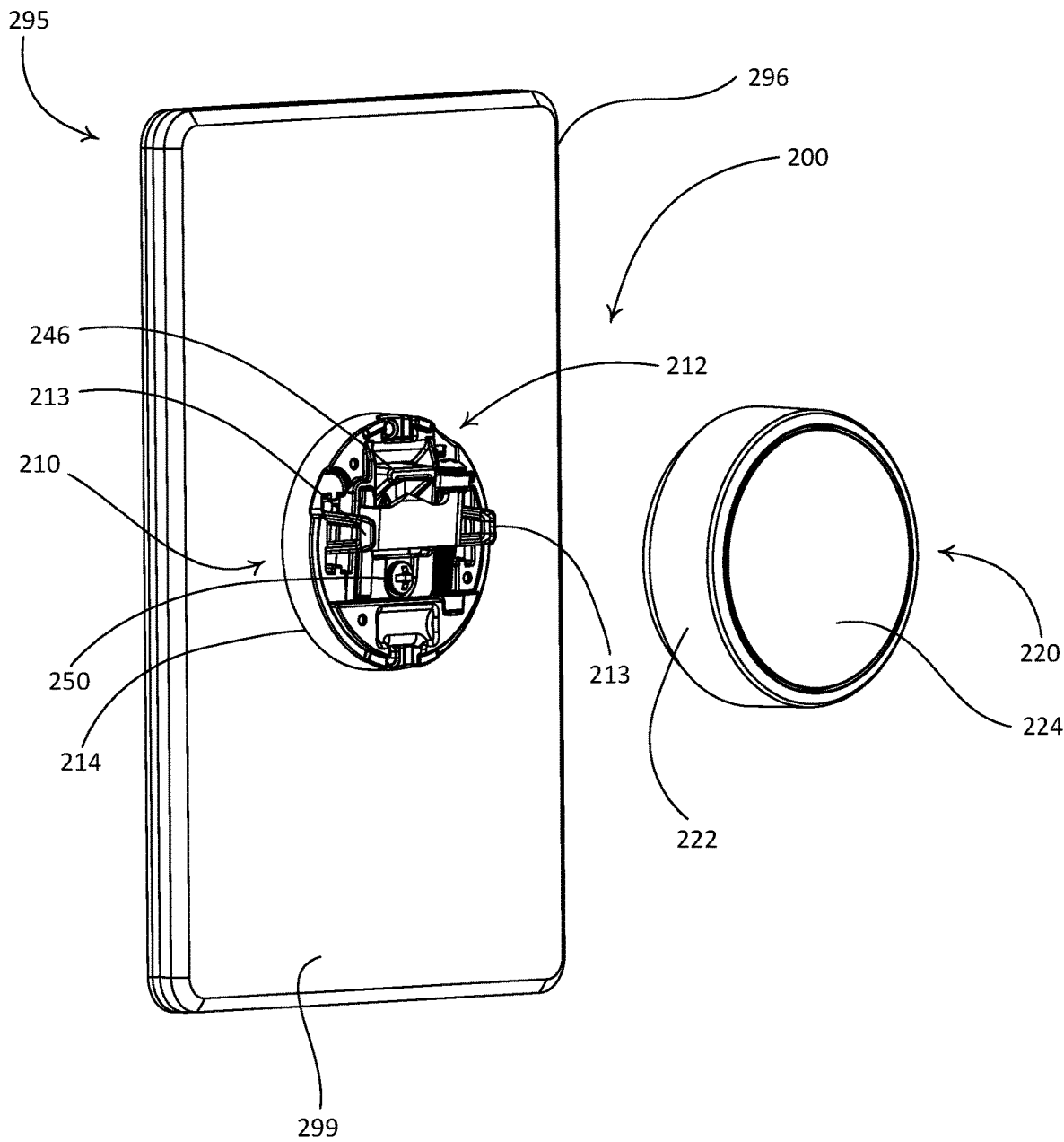
FIG. 3 is a partially exploded view of the example retrofit remote control device illustrated in FIG. 2, with the control unit detached from the base.
Figure 4:
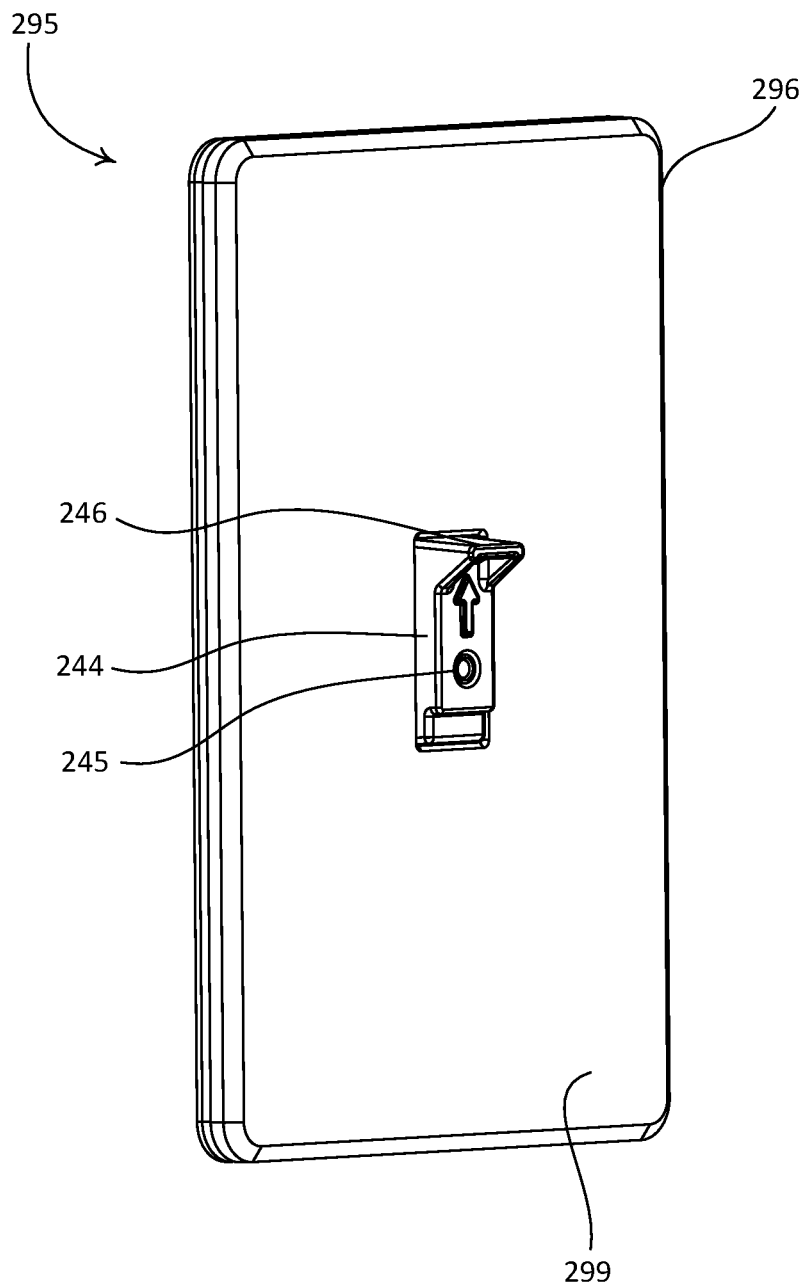
FIG. 4 is a front perspective view of a faceplate assembly of the example retrofit remote control device illustrated in FIG. 2.
Figure 5:
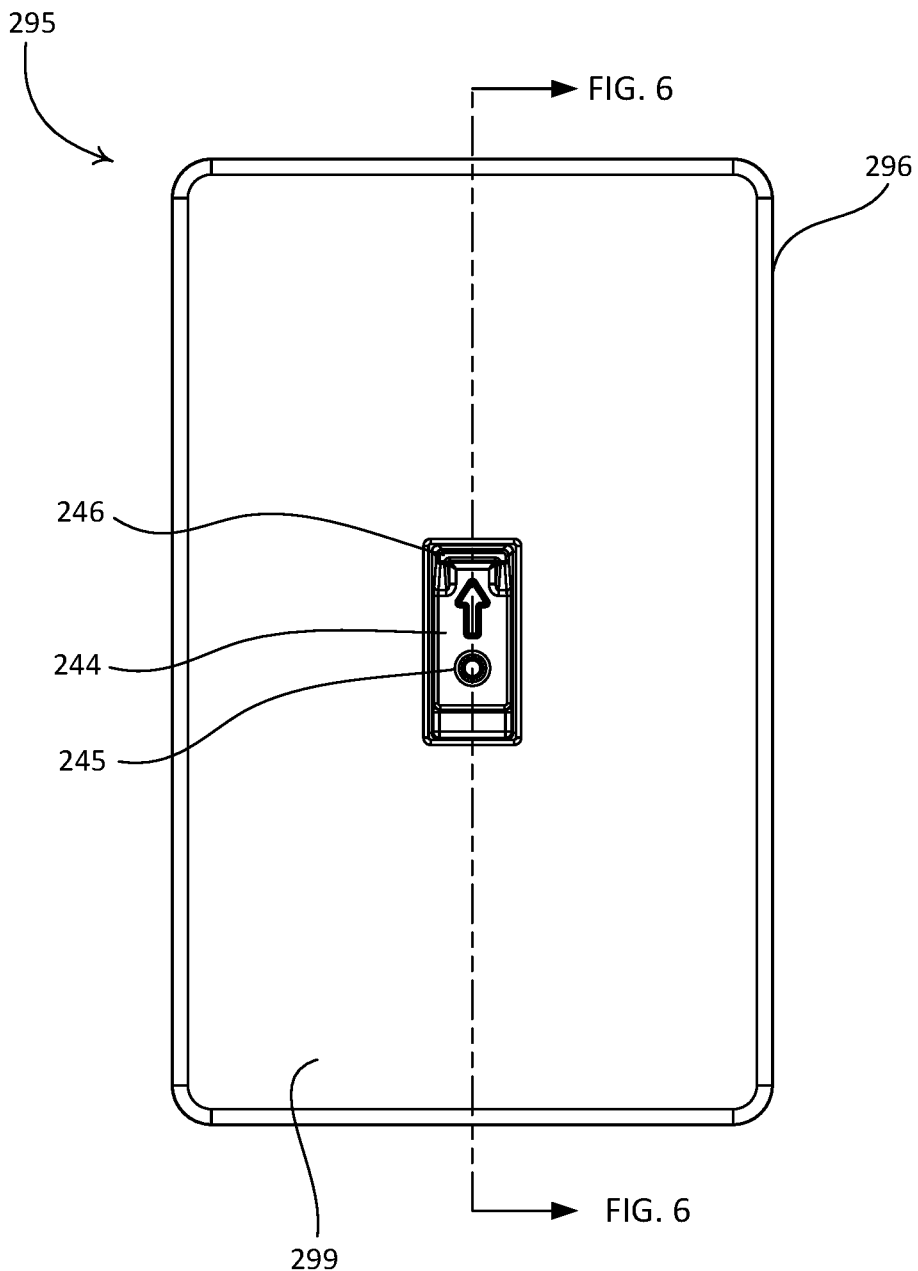
FIG. 5 is a front view of the faceplate assembly of the example retrofit remote control device illustrated in FIG. 2.
Figure 6:
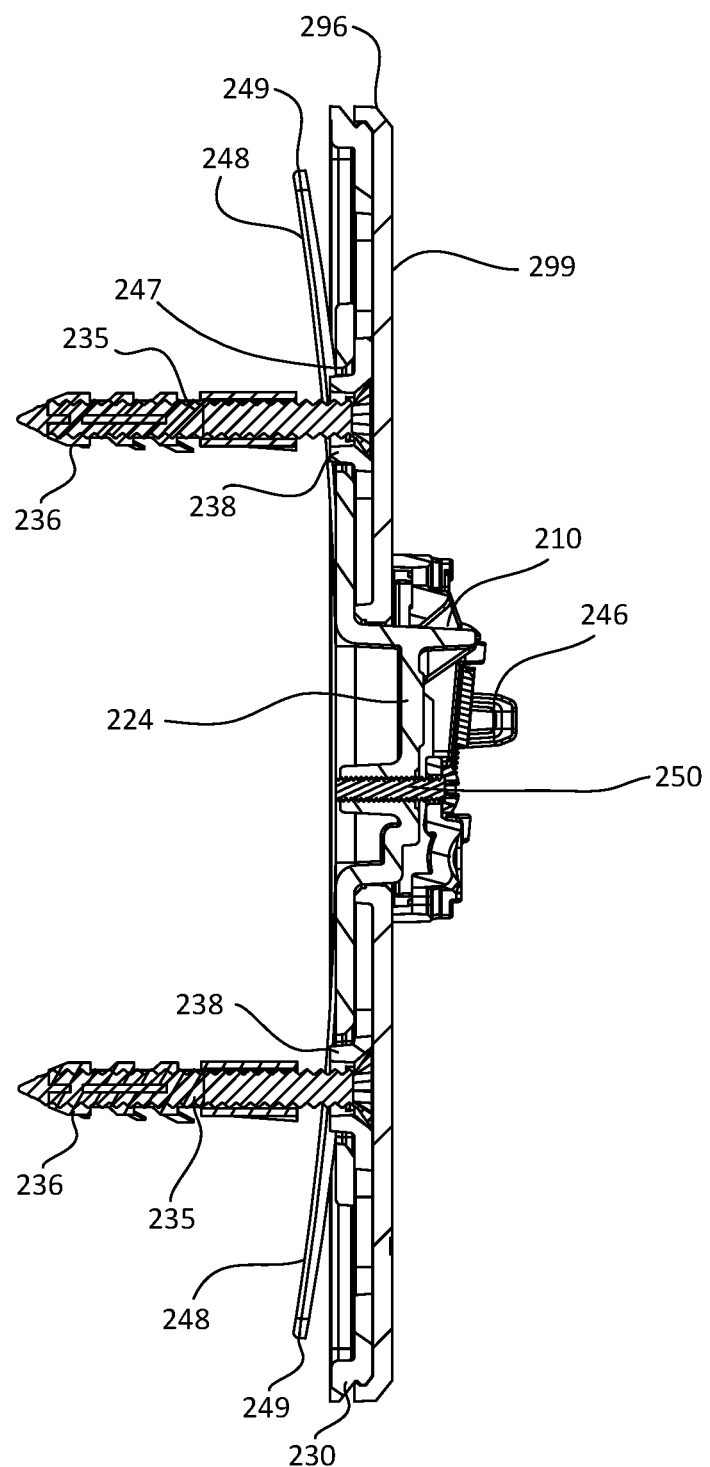
FIG. 6 is a cross-section view of the example retrofit remote control device illustrated in FIG. 2, with the base attached to a mounting plate that abuts a structure.
Figure 7:
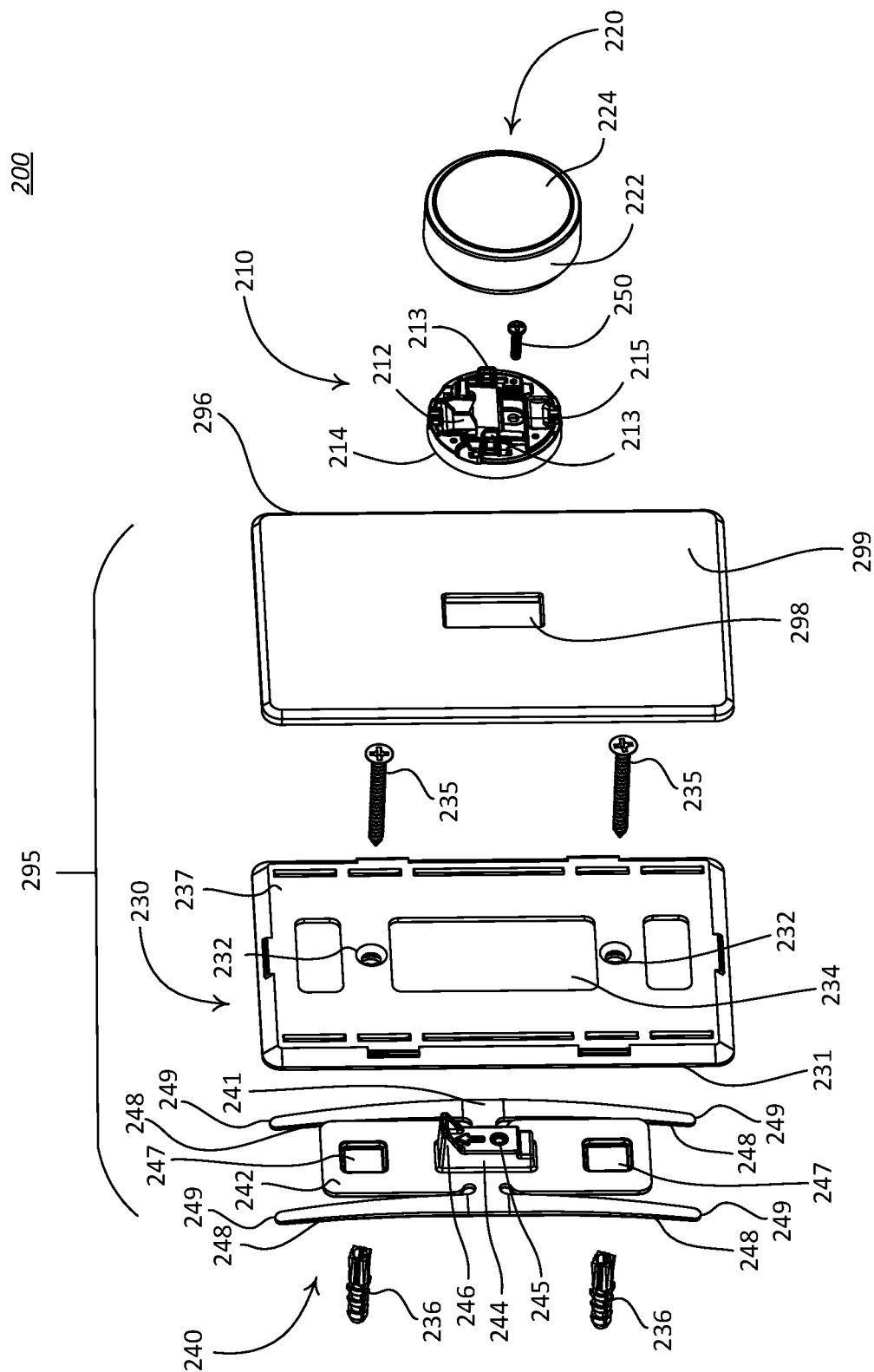
FIG. 7 is a front exploded view of the example retrofit remote control device illustrated in FIG. 2.
Figure 8:
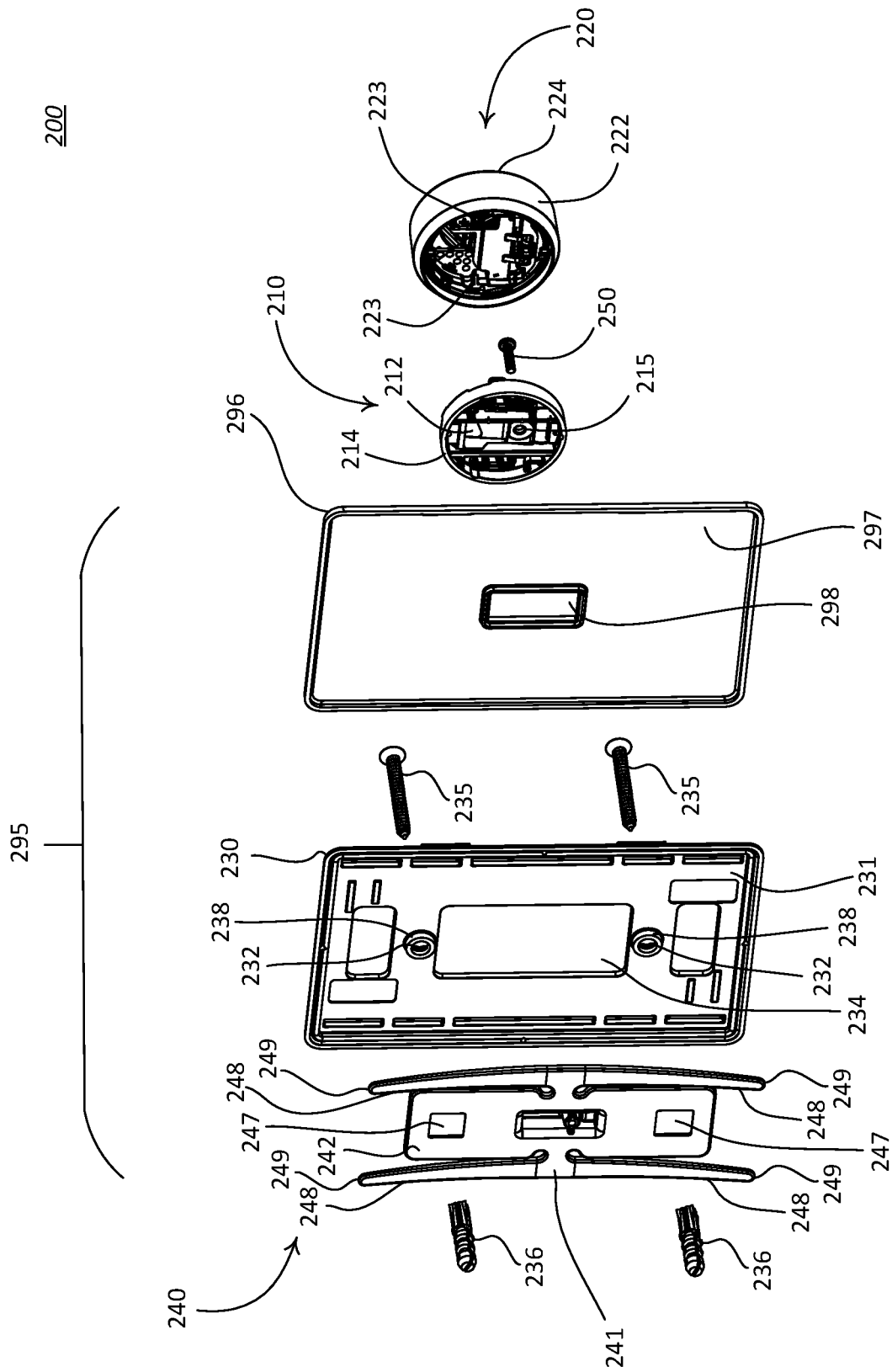
FIG. 8 is a rear exploded view of the example retrofit remote control device illustrated in FIG. 2.
Figure 9:
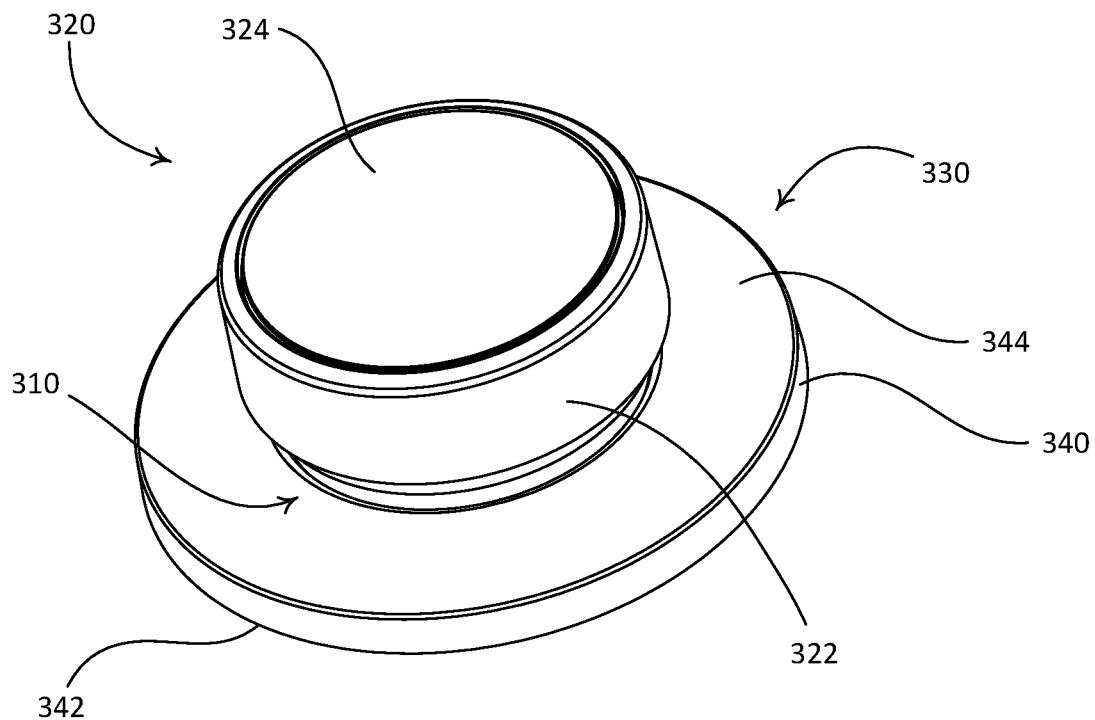
FIG. 9 is a front perspective view of another example retrofit remote control device that is attached to a pedestal.

The remote control device 200 may include a base 210 (e.g., such as the base portion 124 shown in FIG. 1) and a control unit 220 (e.g., such as the rotating portion 122 shown in FIG. 1) that may be attached to the base 210. The base 210 may alternatively be referred to as a base portion or a mounting assembly. The control unit 220 may alternatively be referred to as a control module. It should be appreciated that other control units described herein may similarly be alternatively referred to as control modules. The control unit 220 may include a rotating portion that is rotatable with respect to the base 210. For example, as shown, the control unit 220 includes an annular rotating portion 222 that is configured to rotate about the base 210. The control unit 220 may include an actuation portion 224, which may be operated separately from or in concert with the rotating portion 222. The remote control device 200 may be configured such that the control unit 220 and the base 210 are removably attachable to one another. FIG. 3 depicts the remote control device 200 with the control unit 220 detached from the base 210. When the control unit 220 is attached to the base 210 (e.g., as shown in FIG. 2), the rotating portion 222 may be rotatable in opposed directions about the base 210, for example in the clockwise or counter-clockwise directions.

The remote control device 200 may be configured to transmit one or more wireless communication signals (e.g., RF signals) to one or more control devices. The remote control device 200 may include a wireless communication circuit, e.g., an RF transceiver or transmitter (not shown), via which one or more wireless communication signals may be sent and/or received. The control unit 220 may be configured to transmit digital messages (e.g., including commands) in response to one or more actuations applied to the control unit 220, such as operation of the rotating portion 222 and/or the actuation portion 224. The digital messages may be transmitted to one or more devices associated with the remote control device 200, such as the controllable light source. For example, the control unit 220 may be configured to transmit a command via one or more RF signals to raise the intensity of the controllable light source in response to a clockwise rotation of the rotating portion 222 and a command to lower the intensity of the controllable light source in response to a counterclockwise rotation of the rotating portion 222. The control unit 220 may be configured to transmit a command to toggle the controllable light source (e.g., from off to on or vice versa) in response to an actuation of the actuation portion 224. In addition, the control unit 220 may be configured to transmit a command to turn the controllable light source on in response to an actuation of the actuation portion 224 (e.g., if the control unit 220 knows that the controllable light source is presently off). The control unit 220 may be configured to transmit a command to turn the controllable light source off in response to an actuation of the actuation portion 224 (e.g., if the control unit 220 knows that the controllable light source is presently on).

The base 210 may be configured to be fixedly attached to the actuator of a mechanical switch (e.g., such as the light switch 104 shown in FIG. 1) and may be configured to maintain the actuator in the on position. For example, as shown the base 210 may define an opening 212 that extends therethrough and that is configured to receive at least a portion of the toggle actuator. With the base 210 so fixedly attached to the actuator, the toggle actuator may be prevented from being switched to the off position. The base 210 may define a rear surface 214. Examples of a base and/or mounting assembly for mounting a remote control device to an actuator of a mechanical switch are described in greater detail in commonly-assigned U.S. Patent Application Publication No. 2017/0354023, published Dec. 2, 2017, entitled BATTERY-POWERED RETROFIT REMOTE CONTROL DEVICE, the entire disclosure of which is hereby incorporated by reference.

Although the remote control device 200 may be configured to be mounted over a standard light switch, the remote control device 200 may be mounted to a structure that does not include a light switch. For example, the remote control device 200 may be mounted to a wall in a location where there is no light switch. The remote control device 200 may include a faceplate assembly 295 that is configured to be mounted to a structure. The faceplate assembly 295 may include a faceplate 296, an adapter plate 230, and a mounting plate 240. The faceplate 296 may define a front surface 299 and a rear surface 297. The faceplate 296 may define a faceplate opening 298. The adapter plate 230 may be configured to be attached to the faceplate 296. A front surface 237 of the adapter plate 230 may abut the rear surface 297 of the faceplate 296, for example, when the faceplate 296 is attached to the adapter plate.

The adapter plate 230 may be configured to be secured to the structure. For example, the adapter plate 230 may be configured to receive fasteners 235. The fasteners 235 may be configured to secure the adapter plate 230 to the structure. For example, the fasteners 235 may be received by respective anchors 236 in the structure. The adapter plate 230 may define through-holes 232 that are configured to receive the fasteners 235. The adapter plate 230 may comprise stand-offs 238 extending from a rear surface 231 of the adapter plate 230. The through-holes 232 may extend through the stand-offs 238. The adapter plate 230 may define an adapter opening 234. The mounting plate 240 may define openings 247. The openings 247 may be square shaped. The openings 247 may be configured to receive the stand-offs 238 of the adapter plate 230 and the fasteners 235. The stand-offs 238 may be configured to provide structural support for the adapter plate 230 as the fasteners 235 are tightened into the anchors 236 and/or the structure.

The mounting plate 240 may be configured to float between the adapter plate 230 and the structure. The mounting plate 240 may include a frame 242, a platform 244, a mounting tab 246, and a plurality of spring arms 248. The mounting plate 240 (e.g., the frame 242) may define openings 247 that are configured to receive respective fasteners of the one or more fasteners 235. The platform 244 may extend from the frame 242. The mounting tab 246 may extend from the platform 244. The mounting tab 246 and the platform 244 may be configured to secure the base 210 to the faceplate assembly 295. A midpoint of the platform 244 may be located slightly offset from a center of the mounting plate 240. For example, the platform 244 may be offset from the center of the mounting plate 240 such that the remote control device 200 is centered on the mounting plate 240 when secured to the platform 244. The mounting tab 246 may be configured to extend through the adapter opening 234 and the faceplate opening 298. The mounting tab 246 may be configured to prevent rotation of the base 210 when the remote control device 200 is attached to the mounting plate 240 and the rotating portion 222 is rotated. The plurality of spring arms 248 may be configured to bias the mounting tab away (e.g., forward) from the structure. The plurality of spring arms 248 may attach to the frame 242 proximate to (e.g., at) a midpoint 241 of the frame 242. Each of the plurality of spring arms 248 may define distal portions 249. The distal portion 249 of each of the plurality of spring arms 248 may be biased away from the adapter plate 230 prior to the adapter plate 230 being secured to the structure. The distal portions 249 may abut the structure when the adapter plate 230 is secured to the structure. Each of the plurality of spring arms 248 may be configured to flex as the adapter plate 230 is secured to the structure, for example, such that the distal portion 249 of each of the plurality of spring arms 248 are configured to move toward the adapter plate 230 as the adapter plate is secured to the structure.

The faceplate assembly 295 may include a fastener 250 that is configured to secure the remote control device 200 (e.g., the base 210) to the faceplate assembly 295. For example, the platform 244 may define an aperture 245 that is configured to receive the fastener 250. The fastener 250 may be self-threading. For example, the aperture 245 may be sized such that the fastener 250 secures the base 210 to the flatform 244. Alternatively, the aperture 245 may be threaded such that the aperture 245 has complimentary threads to those of the fastener 250. The base 210 may define a through-hole 215 that is configured to receive the fastener 250.

The remote control device 200 may be configured to enable releasable attachment of the control unit 220 to the base 210. For example, the control unit 220 may comprise two tabs 223 configured to snap onto respective attachment clips 213 on the base 210. The control unit 220 may be installed on the base 210 by pushing the control unit towards the base 210 until the tabs 223 of the control unit 220 engage the attachment clips 213. The control unit 220 may be released from the base 210 by pulling the control unit 220 away from the base 210. In addition, the base 210 may include a release mechanism that may be actuated to release the control unit 220 from the base 210.

Figure 10:
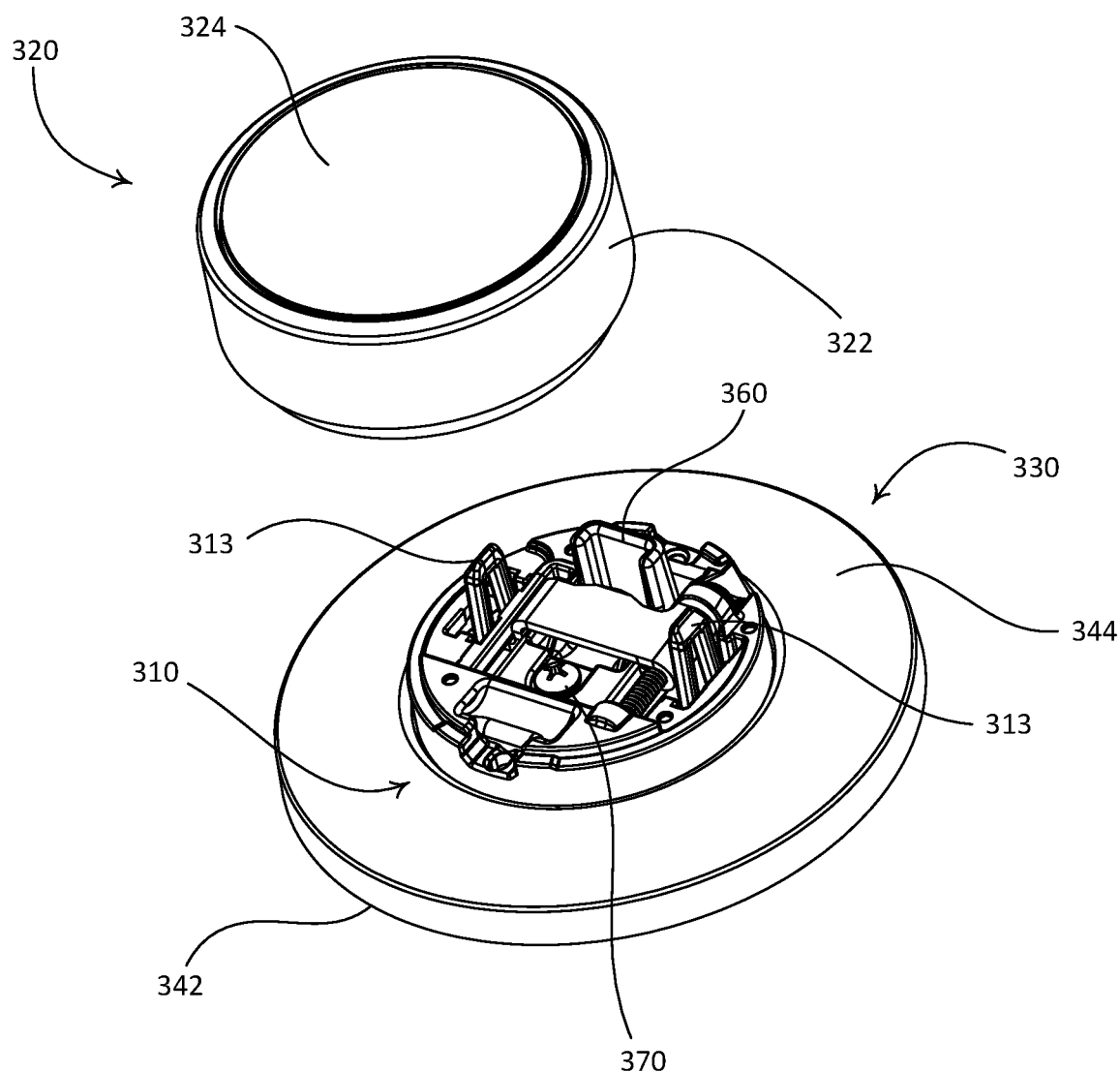
FIG. 10 is a partially exploded view of the example retrofit remote control device illustrated in FIG. 9.
Figure 11:
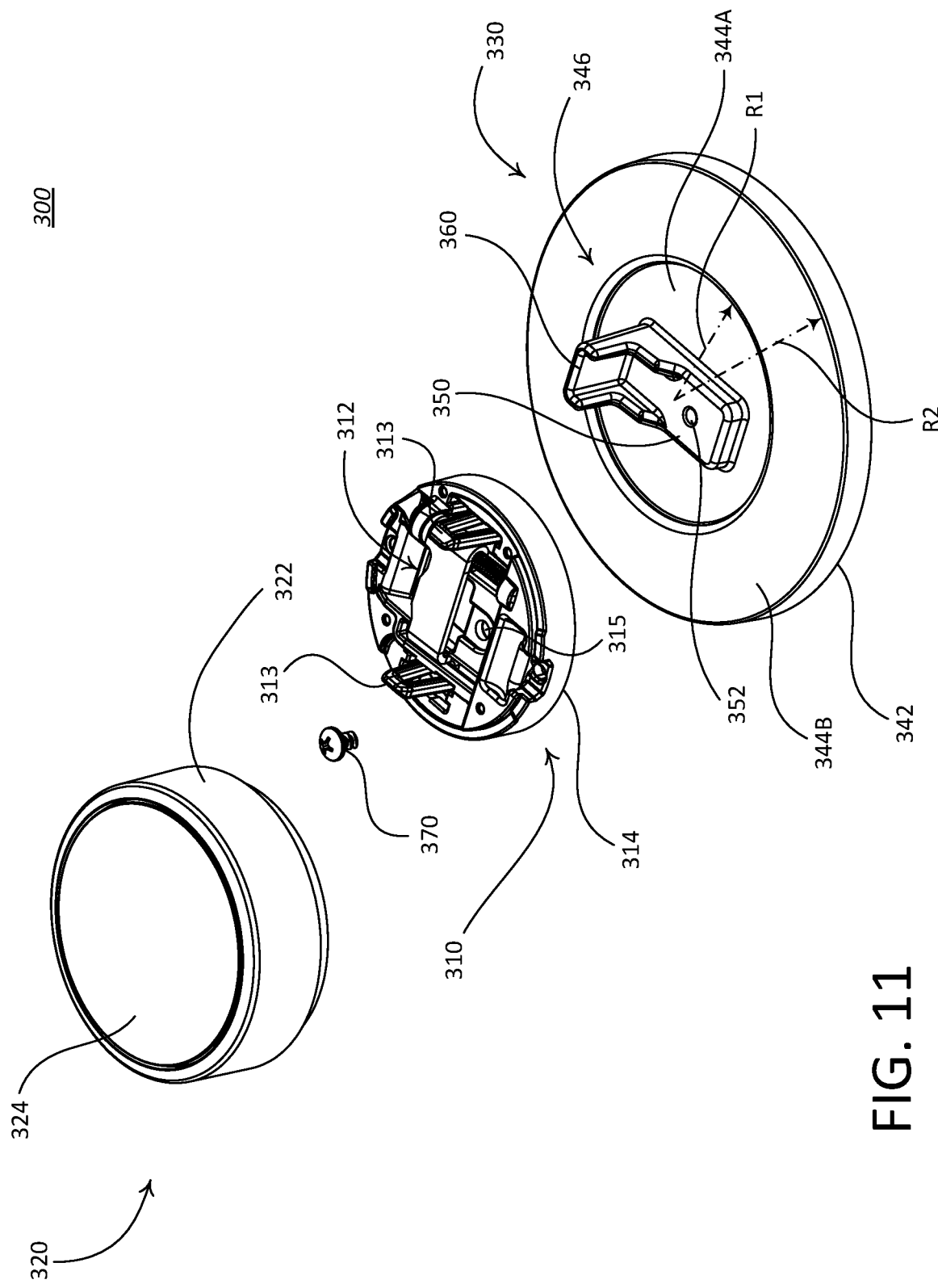
FIG. 11 is an exploded view of the example retrofit remote control device illustrated in FIG. 9.

FIGS. 9-12 illustrate another example remote control device 300 attached to a pedestal 330. The remote control device 300 may include a base 310 (e.g., such as the base 210 shown in FIG. 3) and a control unit 320 (e.g., such as the control unit 220 shown in FIG. 3) that may be attached to the base 310. The base 310 may alternatively be referred to as a base portion or a mounting assembly. The control unit 320 may alternatively be referred to as a control module. It should be appreciated that other control units described herein may similarly be alternatively referred to as control modules. The control unit 320 may include a rotating portion that is rotatable with respect to the base 310. For example, as shown, the control unit 320 includes an annular rotating portion 322 that is configured to rotate about the base 310. The control unit 320 may include an actuation portion 324, which may be operated separately from or in concert with the rotating portion 322. The remote control device 300 may be configured such that the control unit 320 and the base 310 are removably attachable to one another. FIG. 10 depicts the remote control device 300 with the control unit 320 detached from the base 310.

The base 310 may define an opening 312 that extends therethrough and that is configured to receive at least a portion of the pedestal 330. The base 310 may define a rear surface 314.

The pedestal 330 may be a mount that is configured to rest on a horizontal surface. The pedestal 330 may be configured to receive the remote control device 300. For example, the remote control device 300 may be mounted to the pedestal 330. The pedestal 330 may include a plate 340, a platform 350, and a mounting tab 360. The plate 340 may be configured to rest on a horizontal surface. For example, the plate 340 may define a rear surface 342 that is configured to abut the horizontal surface. The plate 340 may define an upper face 344. The plate 340 may be circular.

Figure 12:
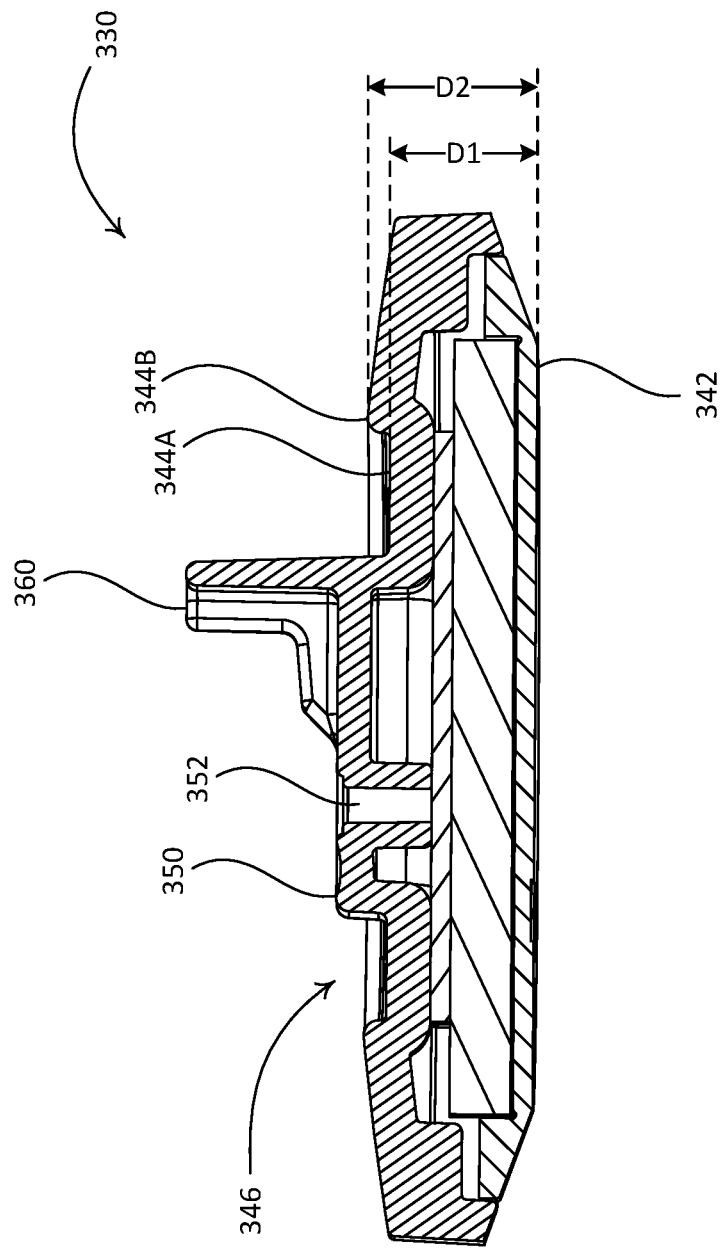
FIG. 12 is a cross-section view of the pedestal of the example retrofit remote control device illustrated in FIG. 9

The plate 340 (e.g., the upper face 344) may define a first portion 344A (e.g., a first upper surface) 1 and a second portion 344B (e.g., a second upper surface). The first portion 344A may be defined between a center of the plate 340 and a first radius R1 from the center of the plate 340. The second portion 344B may be defined between the first radius R1 and a second radius R2 from the center of the plate 340. The first portion 344A may be a first distance D1 from a rear surface 342 of the plate 340. The second portion 344B may be a second distance D2 from the rear surface 342 of the plate 340. The second distance D2 may be greater than the first distance D1, for example, as shown in FIG. 12. The first portion 344A and the second portion 344B may define a cavity 346. For example, a difference between the first portion 344A and the second portion 344B may define the cavity 346. The cavity 346 may be configured to receive a portion of the remote control device 300. The remote control device 300 (e.g., the rear surface 314 of the base 310) may abut the first portion 344A when received by the cavity 346.

Alternatively, the plate 340 (e.g., the upper face 344) may define a first thickness at the first radius R1 from the center of the plate 340. The plate 340 may define a second thickness between the first radius R1 and the second radius R2 from the center of the plate 340. The second thickness may be greater than the first thickness. A difference between the first thickness and the second thickness may define the cavity 346. The cavity 346 may be configured to receive a portion of the remote control device 300. Stated differently, the first portion 344A (e.g., the first upper surface) may define the first thickness and the second portion 344B (e.g., the second upper surface) may define the second thickness.

The platform 350 may extend from the plate 340 (e.g., the upper face 344). For example, the platform 350 may extend from the first portion 344A of the upper face 344. A midpoint of the platform 350 may be located slightly offset from the center of the plate 340. For example, the platform 350 may be offset from the center of the plate 340 such that the remote control device 300 is centered on the plate 340 when secured to the pedestal 330. The platform 350 may include an aperture 352.

The mounting tab 360 may extend from the platform 350. The mounting tab 360 may extend into the opening 312 defined by the base 310. The mounting tab 360 may be configured to prevent rotation of the remote control device 300 (e.g., the base 310) when the rotating portion 322 is rotated.

The platform 350 and the mounting tab 360 may simulate an actuator of a light switch. For example, the platform 350 and the mounting tab 360 may be a similar shape to that of an actuator of a light switch such that the mounting tab 360 extends into the opening 312.

The remote control device 300 may include a fastener 370. The fastener 370 may be configured to secure the remote control device 300 to the pedestal 330. For example, the fastener 370 may be configured to secure the base 310 to the platform 350. The aperture 352 may receive the fastener 370, for example, to secure the remote control device 300 (e.g., the base 310) to the pedestal 330. The fastener 370 may be self-threading. For example, the aperture 352 may be sized such that the fastener 370 secures the base 310 to the platform 350. Alternatively, the aperture 352 may be threaded such that the aperture 352 has complimentary threads to those of the fastener 370. The base 310 may define a through-hole 315 that is configured to receive the fastener 370.

FIGS. 13-16 depict another example remote control device 400 that may be installed in a load control system (e.g., such as load control system 100 shown in FIG. 1). The load control system may include a mechanical switch, such as the mechanical switch 490 (e.g., such as the mechanical switch 190 shown in FIG. 1), that may be in place prior to installation of the remote control device 400, for example pre-existing in the load control system. The load control system may further include one or more electrical loads, such as lighting loads. The mechanical switch 490 may be coupled in series electrical connection between an alternating current (AC) power source and the one or more electrical loads (not shown), such as a controllable light source. The load control system may further include one or more load control devices (not shown) that are electrically connected to the one or more electrical loads and/or integral to the one or more electrical loads, as described herein.

As shown, the example remote control device 400 may include a control unit 420 and a control base 410 that may operate as a mount for the control unit 420. The base 410 may alternatively be referred to as a control base portion or a control mounting assembly. The control unit 420 and the control base 410 may be configured such that the control unit 420 may be removably attached to the control base 410. The control unit 420 may alternatively be referred to as a control module. It should be appreciated that other control units described herein may similarly be alternatively referred to as control modules.

Figure 13:
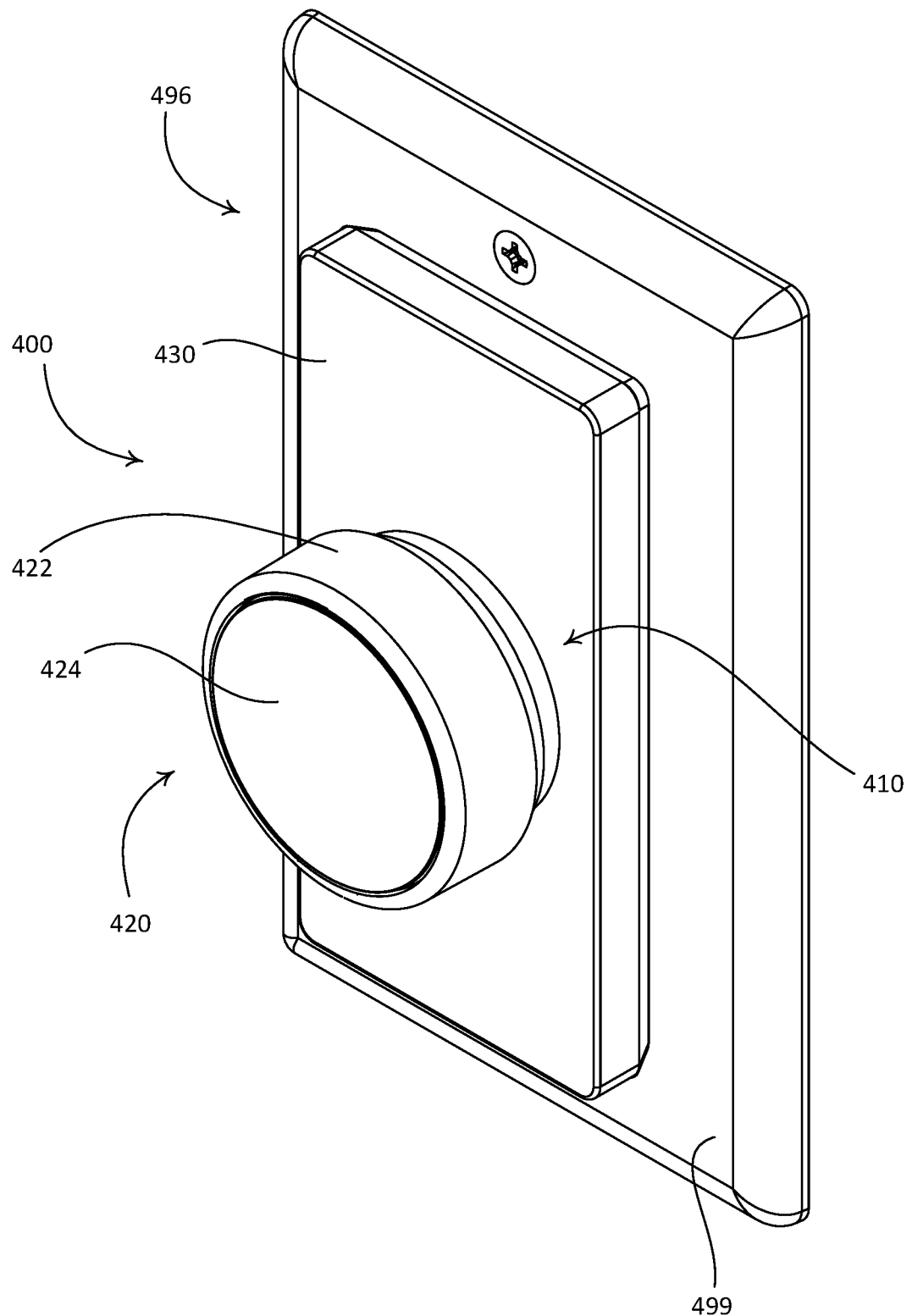
FIG. 13 is a front perspective view of another example retrofit remote control device that includes a control unit component and a base component.
Figure 16:
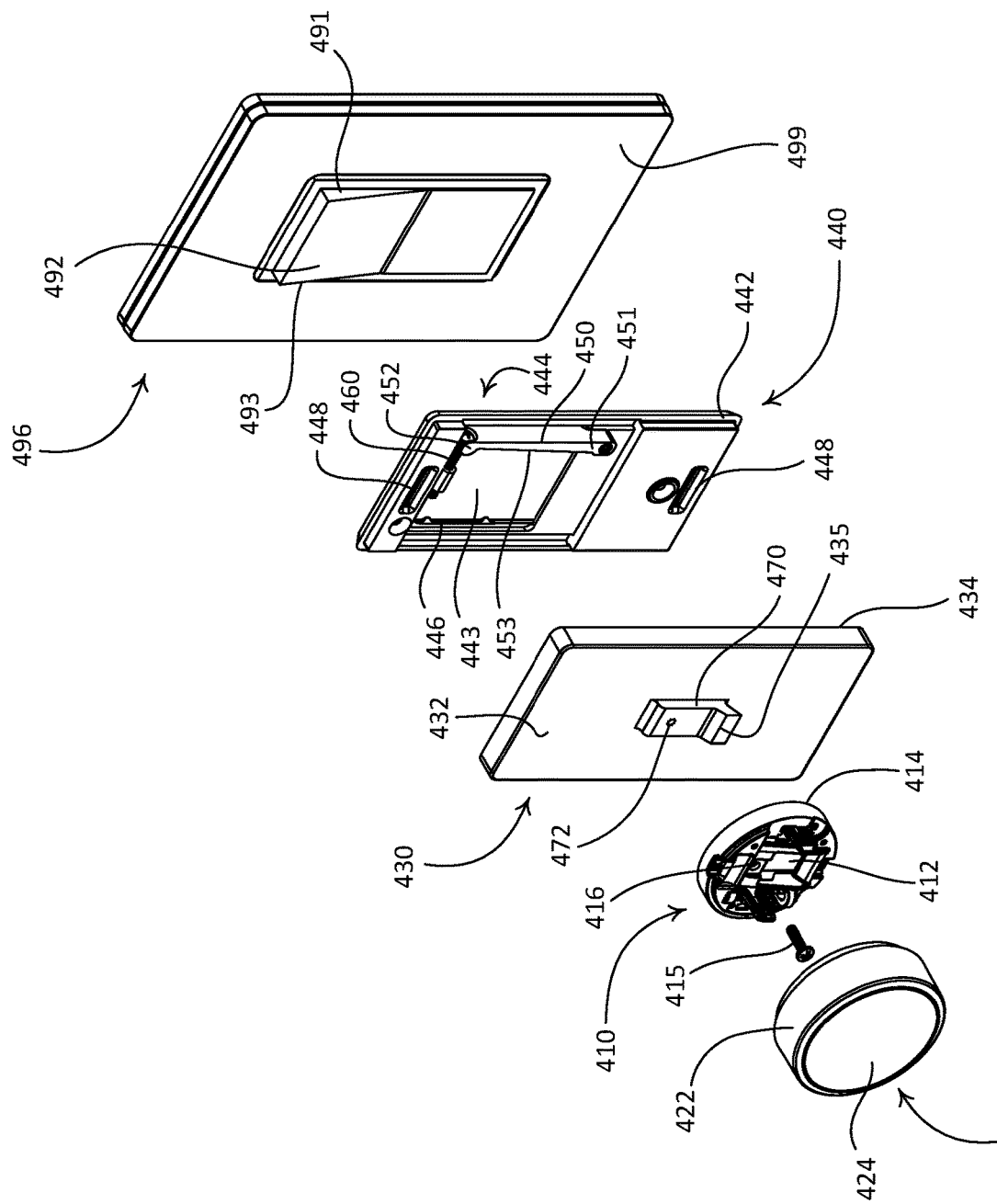
FIG. 16 is an exploded view of the example retrofit remote control device illustrated in FIG. 13.

The control unit 420 may comprise a user interface including a rotating portion 422 and an actuation portion 424. The rotating portion 422 may be rotatable with respect to the control base 410. For example, as shown, the control unit 420 includes an annular rotating portion 422 that is configured to rotate about the control base 410. The remote control device 400 may be configured such that the control unit 420 and the control base 410 are removably attachable to one another. FIG. 16 depicts the remote control device 400 with the control unit 420 detached from the control base 410. When the control unit 420 is attached to the control base 410 (e.g., as shown in FIG. 13), the rotating portion 422 may be rotatable in opposed directions about the control base 410, for example in the clockwise or counter-clockwise directions. The control base 410 may be configured to be mounted over a light switch such that the application of rotational movement to the rotating portion 422 does not actuate the light switch.

The actuation portion 424 may be operated separately from or in concert with the rotating portion 422. As shown, the actuation portion 424 may include a circular surface within an opening defined by the rotating portion 422. In an example implementation, the actuation portion 424 may be configured to move inward toward the light switch to actuate a mechanical switch (not shown) inside the control unit 420, for instance as described herein. The actuation portion 424 may be configured to return to an idle or rest position (e.g., as shown in FIG. 13) after being actuated. In this regard, the actuation portion 424 may be configured to operate as a toggle control of the control unit 420.

The remote control device 400 may be configured to transmit one or more wireless communication signals (e.g., RF signals) to one or more control devices. The remote control device 400 may include a wireless communication circuit, e.g., an RF transceiver or transmitter (not shown), via which one or more wireless communication signals may be sent and/or received. The control unit 420 may be configured to transmit digital messages (e.g., including commands) in response to one or more actuations applied to the control unit 420, such as operation of the rotating portion 422 and/or the actuation portion 424. The digital messages may be transmitted to one or more devices associated with the remote control device 400, such as the controllable light source. For example, the control unit 420 may be configured to transmit a command via one or more RF signals to raise the intensity of the controllable light source in response to a clockwise rotation of the rotating portion 422 and a command to lower the intensity of the controllable light source in response to a counterclockwise rotation of the rotating portion 422. The control unit 420 may be configured to transmit a command to toggle the controllable light source (e.g., from off to on or vice versa) in response to an actuation of the actuation portion 424. In addition, the control unit 420 may be configured to transmit a command to turn the controllable light source on in response to an actuation of the actuation portion 424 (e.g., if the control unit 420 knows that the controllable light source is presently off). The control unit 420 may be configured to transmit a command to turn the controllable light source off in response to an actuation of the actuation portion 424 (e.g., if the control unit 420 knows that the controllable light source is presently on).

The control base 410 may be configured to be fixedly attached to an actuator 492 of the mechanical switch 490, such as a paddle actuator of the light switch, and may be configured to maintain the actuator in the on position. For example, the remote control device 400 may include a cover portion 430 (e.g., a mounting adapter) and a cover base 440. The cover base 440 may alternatively be referred to as a cover base portion or a cover mounting assembly. The cover portion 430 may be configured to cover the actuator of the mechanical switch and receive the control base 410. For example, the control base 410 may be attached (e.g., releasably attached) to the cover portion 430. The cover base 440 may define an opening 412 for allowing for attachment of the cover base 440 to the cover portion 430 (e.g., as will be described in greater detail below). The cover portion 430 may be configured to releasably retain the control base 410. The cover portion 430 may define a front surface 432 and a rear surface 434. The cover portion 430 may include a mounting tab 435 that extends from the front surface 432. The mounting tab 235 may be configured to be received in the opening 412 of the control base 410. The mounting tab 435 may be configured to prevent rotation of the control base 410 when the control base 410 is attached to the cover portion 430. The cover portion 430 may include one or more tabs 436 that extend from the rear surface 434. The one or more tabs 436 may be configured to secure the cover portion 430 to the cover base 440.

The cover base 440 may be configured to releasably retain the cover portion 430 when the control base 410 is attached to the cover portion 430. The cover base 440 may include a frame 442 and an engagement mechanism 444. The frame 442 may be configured to be mounted over the actuator 492 of the mechanical switch 490. Although the frame 442 is shown in FIGS. 14 and 16 installed in a first orientation, it should be appreciated that the frame 442 may be configured to be installed in a second orientation that is separated from the first orientation by 180 degrees. The frame 442 may be installed in the first or second orientation depending on whether an upper portion or a lower portion of the actuator 492 protrudes when power is being delivered to an electrical load. The frame 442 may include a frame opening 443 that extends therethrough. The frame opening 443 may be configured to receive a portion of the actuator 492. For example, the frame opening 443 may be configured to receive the upper portion of the actuator 492 when installed in the first orientation and may be configured to receive the lower portion of the actuator 492 when installed in the second orientation.

The engagement mechanism 444 may be configured to secure the cover base 440 to the actuator 492. For example, the engagement mechanism 444 may secure the cover base 440 in a mounted position relative to the actuator 492. The engagement mechanism 444 may cause a rear surface 445 to be biased against an outer surface 499 of the faceplate 496 such that the actuator 492 is maintained in a first position in which power is delivered to the electrical load. The engagement mechanism 444 may be operable to contact a first side 491 of the actuator 492 such that an opposed second side 493 of the actuator 492 is biased against a corresponding inner wall 446 of the frame 442. The inner wall 446 may define (e.g., partially define) the frame opening 443.

The engagement mechanism 444 may include a clamp arm 450 (e.g., a bar), for example, as shown in FIGS. 14 and 16. The clamp arm 450 may extend into the frame opening 443. A first end 451 of the clamp arm 450 may be supported by the frame 442. A second end 452 of the clamp arm 450 may be translatable toward a center of the frame opening 443 (e.g., toward the inner wall 446). For example, the first end 451 may be pivotally supported by the frame 442 such that the second end 452 is configured to move toward (e.g., and away from) the inner wall 446. The clamp arm 450 may define an edge 453 that faces the center of the frame opening 443. The edge 453 (e.g., at least a portion of the edge 453) may be configured to abut the first side 491 of the actuator 492. For example, the edge 453 may abut the first side 491 of the actuator 492 as the second end 452 of the clamp arm 450 is translated toward the center of the frame opening 443.

The engagement mechanism 444 may include a screw 460. The screw 460 may operably connect the second end 452 of the clamp arm 450 to the frame 442. The screw 460 may be configured to translate the clamp arm 450 toward (e.g., and away from) the inner wall 446. For example, driving the screw 460 (e.g., clockwise) may cause the second end 452 of the clamp arm 450 to travel toward the inner wall 446. Driving the screw 460 in the opposite direction (e.g., counter-clockwise) may cause the second end 452 of the clamp arm 450 to travel away from the inner wall 446.

The frame 442 may define one or more slots 448. The slots 448 may be configured to receive corresponding tabs 436 of the cover portion 430, for example, to secure the cover portion 430 to the cover base 440.

The remote control device 400 may include a fastener 415. The fastener 415 may be configured to secure the remote control device 400 (e.g., the control base 410) to the cover portion 430. For example, the fastener 415 may be configured to secure the control base 410 to a platform 470 that extends from the front surface 432 of the cover portion 430. The mounting tab 435 may extend from the platform 470. A midpoint of the platform 470 may be located slightly offset from the center of the cover portion 430. For example, the platform 470 may be offset from the center of the cover portion 430 such that the remote control device 400 is centered on the cover portion 430 when secured to the platform 470.

The platform 470 may define an aperture 472. The aperture 472 may receive the fastener 415, for example, to secure the remote control device 400 (e.g., the control base 410) to the cover portion 430. The fastener 415 may be self-threading. For example, the aperture 472 may be sized such that the fastener 415 secures the control base 410 to the cover portion 430. Alternatively, the aperture 472 may be threaded such that the aperture 472 has complimentary threads to those of the fastener 415. The control base 410 may define a through-hole 416 that is configured to receive the fastener 415. A rear surface 414 of the control base 410 may abut the front surface 432 of the cover portion 430 when the remote control device 400 is secured to the cover portion 430.

It should be appreciated that retrofit remote control devices (e.g., the example remote control devices 120, 200, 300, 400 illustrated and described herein) may be implemented with alternative user interfaces that may be configured to be attached to the bases/base portions 124, 210, 310, 410 (e.g., other than the rotating portions 122, 222, 322, 422 and the actuation portions 224, 324, 424). For example, any of the bases/base portions 124, 210, 310, 410 may be configured to have mounted thereto a remote control device having another type of actuator that moves relative to the base, such as a linear slider and/or a rocker switch. Additionally, a remote control device having one or more buttons and/or a touch sensitive surface (e.g., a capacitive touch surface) for controlling, for example, electrical loads may be configured to be mounted to the bases/base portions 124, 210, 310, 410.

It should further be appreciated that the control units 220, 320, 420 illustrated and described herein are not limited to having circular shapes, and that the control units may be alternatively implemented having other shapes. For example, any of the control units 220, 320, 420 (e.g., the rotating portions 122, 222, 322, 422 and/or the actuation portions 224, 324, 424) may be configured with rectangular shapes, square shapes, diamond shapes, triangular shapes, oval shapes, star shapes, or any other suitable shapes. Additionally, the respective front surfaces of any of the actuation portions 224, 324, 424 and/or the side surfaces of each of the rotating portions 122, 222, 322, 422 may be planar or non-planar. Furthermore, the surfaces of any of the control units 220, 320, 420 may be characterized by various colors, finishes, designs, patterns, or the like.

The invention claimed is:

1. A faceplate assembly that is configured to be mounted to a structure, and that is further configured such that a remote control device that controls an amount of power delivered to an electrical load is attachable to the faceplate assembly, the faceplate assembly comprising:
   a faceplate defining a faceplate opening;
   an adapter that is configured to be attached to the faceplate, the adapter configured to be secured to the structure, and the adapter defining an adapter opening; and
   a mounting plate that is configured to be located between the adapter and the structure, the mounting plate comprising:
      a frame;
      a platform that extends from the frame;
      a mounting tab that extends from the platform, the mounting tab configured to extend through the adapter opening and the faceplate opening; and
      one or more spring arms configured to bias the mounting tab forward away from the structure.

2. The faceplate assembly of claim 1, wherein the one or more spring arms are attached to the frame proximate to a midpoint of the frame.

3. The faceplate assembly of claim 1, wherein distal portions of each of the one or more spring arms are configured to abut the structure when the adapter is secured to the structure.

4. The faceplate assembly of claim 3, wherein the distal portions of each of the one or more spring arms are biased away from the adapter prior to the adapter being secured to the structure.

5. The faceplate assembly of claim 4, wherein each of the one or more spring arms are configured to flex such that the distal portion of each of the plurality of spring arms are configured to move toward the adapter as the adapter is secured to the structure.

6. The faceplate assembly of claim 1, wherein the adapter is secured to the structure using one or more of fasteners or anchors.

7. The faceplate assembly of claim 6, wherein the mounting plate defines fastener openings that are configured to receive respective fasteners.

8. The faceplate assembly of claim 1, further comprising a fastener configured to secure the remote control device to the faceplate assembly.

9. The faceplate assembly of claim 8, wherein the platform defines an aperture that is configured to receive the fastener.

10. The faceplate assembly of claim 1, wherein the mounting tab is configured to prevent rotation of a base of the remote control device when the remote control device is attached to the mounting plate.

11. A remote control device that is configured to be mounted to a structure, and wherein the remote control device controls an amount of power delivered to an electrical load, the remote control device comprising:
- a control unit that includes an attachment portion and a rotating portion that is configured to rotate relative to the attachment portion;
- a base to which the control unit is attachable, the base configured to releasably retain the control unit;
- a faceplate defining a faceplate opening;
- an adapter that is configured to be attached to the faceplate, the adapter configured to be secured to the structure, and the adapter defining an adapter opening;
- a mounting plate that is configured to be located between the adapter and the structure, the mounting plate comprising:
  - a frame;
  - a platform that extends from the frame;
  - a mounting tab that extends from the platform, the mounting tab configured to extend through the adapter opening and the faceplate opening; and
  - one or more spring arms configured to bias the mounting tab forward away from the structure;
- a wireless communication circuit; and
- a control circuit that is communicatively coupled to the rotating portion and the wireless communication circuit, the control circuit configured to cause the wireless communication circuit to transmit a control signal in response to an actuation of the rotating portion.

12. The remote control device of claim 11, wherein the one or more spring arms are attached to the frame proximate to a midpoint of the frame.

13. The remote control device of claim 11, wherein distal portions of each of the one or more spring arms are configured to abut the structure when the adapter is secured to the structure.

14. The remote control device of claim 13, wherein the distal portions of each of the one or more spring arms are biased away from the adapter prior to the adapter being secured to the structure.

15. The remote control device of claim 14, wherein each of the one or more spring arms are configured to flex such that the distal portion of each of the plurality of spring arms are configured to move toward the adapter as the adapter is secured to the structure.

16. The remote control device of claim 11, wherein the adapter is secured to the structure using one or more of fasteners or anchors.

17. The remote control device of claim 16, wherein the mounting plate defines fastener openings that are configured to receive respective fasteners.

18. The remote control device of claim 11, further comprising a fastener configured to secure the remote control device to the mounting plate, and wherein the platform defines an aperture that is configured to receive the fastener.

19. The remote control device of claim 11, wherein the base comprises a mechanism that is operable to cause the control unit to release from the base.

20. The remote control device of claim 11, wherein the mounting tab is configured to prevent rotation of the base when the remote control device is attached to the mounting plate.

* * * * *